Oct. 27, 1959 B. L. HAVENS 2,910,239

SERIAL TYPE BINARY-CODED DECIMAL ADDER

Filed Jan. 30, 1953 4 Sheets-Sheet 1

INVENTOR
BYRON L. HAVENS
BY Dwight D. Mooney
ATTORNEY

Oct. 27, 1959 B. L. HAVENS 2,910,239

SERIAL TYPE BINARY-CODED DECIMAL ADDER

Filed Jan. 30, 1953 4 Sheets-Sheet 2

INVENTOR
BYRON L. HAVENS
BY Dwight D. Mooney
ATTORNEY

SERIAL TYPE BINARY-CODED DECIMAL ADDER

Filed Jan. 30, 1953 4 Sheets-Sheet 3

INVENTOR
BYRON L. HAVENS
BY Dwight D. Mooney
ATTORNEY

Oct. 27, 1959 B. L. HAVENS 2,910,239

SERIAL TYPE BINARY-CODED DECIMAL ADDER

Filed Jan. 30, 1953 4 Sheets-Sheet 4

INVENTOR
BYRON L. HAVENS
BY Dwight D. Mooney
ATTORNEY

United States Patent Office 2,910,239
Patented Oct. 27, 1959

2,910,239

SERIAL TYPE BINARY-CODED DECIMAL ADDER

Byron L. Havens, Closter, N.J., assignor to International Business Machines Corporation, New York, N.Y., a corporation of New York Application January 30, 1953, Serial No. 334,256
7 Claims. (Cl. 235—170)

This invention relates to digital adders and more particularly to a circuit for adding decimal numbers wherein each digit is represented in the pure binary notation.

In the binary notation only two digits are employed, i.e. 0 and 1. The decimal digit 0 is represented by binary digit 0 and decimal digit 1 is represented by binary digit 1. These binary digits are referred to as bits. The digital positions or orders in a binary number, reading from right to left, correspond in value to $2^0$, $2^1$, $2^2$, $2^3$, $2^4$, etc. or decimal digits 1, 2, 4, 8, 16 etc. respectively. For example, binary number 1001 represents decimal digit 9 which is determined by the addition of decimal digits 1 and 8 indicated by a binary 1 in the extreme right and left binary positions respectively. Hence, by using binary bits or pulses in groups of four wherein a pulse represents a binary 1 and the absence of a pulse represents a binary 0 any decimal digit from 0 through 9 inclusive may be written in the pure binary notation.

The system of representing decimal numbers, digit for digit, in the pure binary notation is referred to herein as the binary-decimal system. Since four consecutive binary orders, reading from right to left, represent the decimal digits 1, 2, 4 and 8 for the units decimal order, it follows that the four binary orders of the tens decimal order represent the decimal digits 10, 20, 40, and 80 respectively. Likewise, in subsequent decimal orders, for example, the four respective binary orders of the hundreds order represent the decimal digits 100, 200, 400 and 800 respectively.

As an example, 459 will be represented in the binary-decimal system by 0100,0101,1001. The four binary bits at the right represent the decimal digit 9 of the units order, the next four bits to the left represent the decimal digit 5 of the tens order, and the four bits at the extreme left represent the decimal digit 4 of the hundreds order.

It is clear from the above that any decimal number from 0–15 inclusive can be represented by a group of four binary bits. If the decimal number is 16, then a binary carry occurs to the next group of four binary bits. However, in the binary-decimal system, only the decimal digits (0–9 inclusive) are represented by each group of four binary bits. The column by column addition of two decimal numbers may provide for any one column, at most, a sum of 18 plus a carry. The actual decimal sum is, therefore, between 0–19 inclusive. As stated, if this addition is performed in the pure binary notation, and the sum is 16 or more, a carry is provided and in any case if the sum is over 9 (1001), the further addition of a 6 (0110) will be required to convert the pure binary notation sum to the binary-decimal system. It follows that the sum, in the binary-decimal system, of two decimal numbers written in the binary-decimal system, may be obtained by adding the two numbers in the pure binary notation and adding 6 (0110) to each group of four binary bits of the sum, reading from right to left, representing a decimal value greater than 9.

This is illustrated by the following Table I.

*Table I*

| | | |
|---|---|---|
| 0100,0101,1001 | (binary decimal) | augend 459 |
| 0101,1001,0000 | (binary decimal) | addend 590 |
| 1 1 | carry | |
| 1001,1110,1001 | (pure binary addition) | |
| 0110,0110,0000 | correct | |
| 1,1111,11 | carry | |
| 1,0000,0100,1001 | (binary decimal) | sum 1049 |

The augend 459 and the addend 590 are written in the binary-decimal system and added in the pure binary notation. In such addition, binary 0 plus binary 0 equals binary 0, binary 1 plus binary 0 equals binary 1, binary 1 plus binary 1 equals binary 0 plus a carry of binary 1 and binary 1 plus binary 1 plus a carry of binary 1 equals binary 1 plus a carry of binary 1. All carry is illustrated in Table I. Inspection of the sum resulting from pure binary addition shows that each of the three groups of four binary bits, reading from right to left, represents the decimal numbers 9, 14 and 9 respectively. Obviously then, 0110 must be added to the middle group. However, this addition produces a carry to the left group or next decimal column and thereby causes the left group to represent a decimal value of 10. Therefore, 0110 must also be added to the left group. This addition produces a carry to the next or thousands decimal order. The respective groups of binary bits of the binary-decimal sum, reading from left to right, represent 1,000, 0, 40 and 9 respectively. The correct decimal sum of 1,049 is, therefore, shown.

A principal object of the invention is to provide a novel adder of the serial input type for adding in the binary-decimal system.

Another object is to provide a novel serial adder for adding groups of binary bits, each group representing a decimal number.

A further object is to provide a novel serial adder for adding in the pure binary notation two decimal numbers, each decimal digit of which is represented in the pure binary notation; group sensing the sum of the binary bits in groups of four; and correcting the sum so that each group of the resulting sum in the binary notation represents a digit of the decimal sum.

Still another object is to provide a novel means for sensing a sum in the binary notation and correcting that sum in accordance with its corresponding decimal value.

A still further object is to provide a novel serial type adder for adding in the binary notation two decimal numbers, represented digit for digit in the binary notation, sensing the binary sum of each decimal column and supplying two corrections in time sequence to said binary sum so that the resulting sum represents the decimal sum in the binary notation, digit for digit, said corrections being initiated by a single pulse.

Other objects of the invention will be pointed out in the following description and claims and illustrated in the accompanying drawings, which disclose, by way of examples, the principle of the invention and the best mode, which has been contemplated, of applying that principle.

Briefly, each number to be added is applied serially in the binary-decimal system to a separate input terminal and corresponding orders of each number are applied simultaneously. A preselected uniform time interval elapses between the occurrence of successive bits. In the embodiment shown, the two numbers to be added are applied to a first binary adder where they are added in the pure binary notation. The output of the first binary adder is applied through delay circuits to a second binary adder. A binary-decimal discriminator is provided to determine whether or not the output of the first binary adder is represented in the binary-decimal system; (i.e. whether or not this output is greater than 9) and if not, to supply a 6 (0110) to the second binary adder to insure that the output of the second binary adder represents the sum in the binary-decimal system of the two numbers to be added. To effect such a determination or rationalization, connections are made from the binary-decimal discriminator to the delay circuitry connecting the first and second binary adders and from the binary-decimal discriminator to the second binary adder and means are provided to render thas discriminator effective during a corresponding time interval during the occurrence of each group of binary bits representing a decimal number.

As explained above, if the decimal digit represented is greater than 9, the addition of a 6 (0110) is required. This may be determined by the existence of either of two criteria; namely, the presence of a carry in the first binary adder (decimal 16), or the existence of a binary 1 in the fourth binary order plus the existence of a binary 1 in the third or second binary orders (i.e. 8 + 4 or 8 + 2). If either of these two criteria is present, the binary-decimal discriminator is rendered effective to transfer two pulses to the secondary binary adder i.e. a binary 1 to the second and third binary orders to effect the addition of 6 (0110) to the sum. The addition of 6 (0110) in accordance with the existence of these criteria insures that the output of the second binary adder is represented in the binary-decimal system. Connection is also provided between the second binary adder and the binary-decimal discriminator to effect the addition of 6 (0110) into the former when a carry therein causes a group of four binary bits corresponding to a decimal column to represent a value greater than 9.

Figure 1:
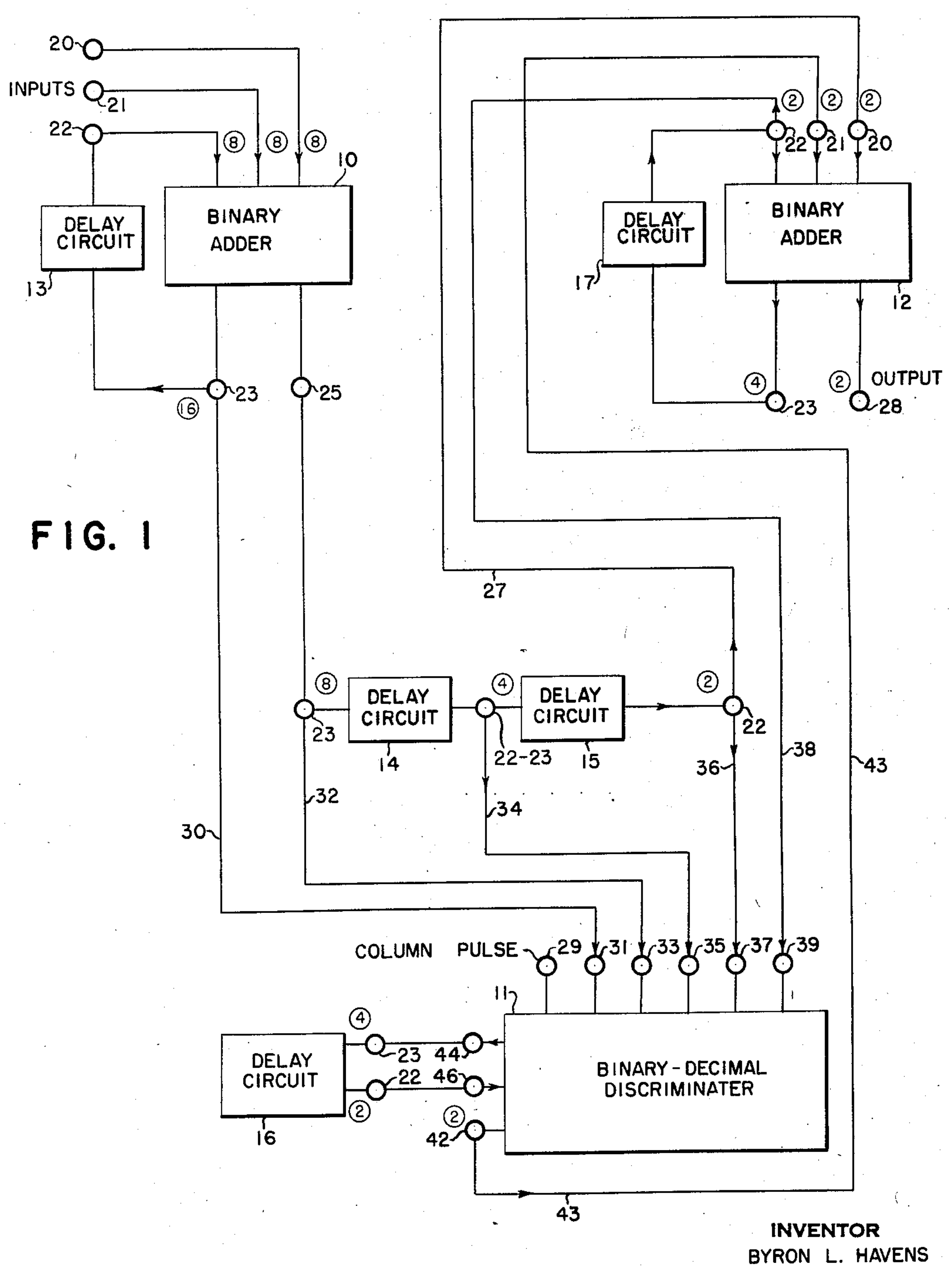
Fig. 1 is a block diagram of one embodiment of the invention.

Referring more particularly to Fig. 1 there is shown a binary adder 10, a binary-decimal discriminator 11, a binary adder 12 and five delay circuits 13–17 inclusive.

An input representing a decimal number to be added is applied to each of the input terminals 20 and 21. Each of these inputs is in the binary-decimal system wherein a pulse represents a binary 1 and the absence of a pulse represents binary 0. A third input terminal 22 is supplied from the delay circuit 13 having its input connected to terminal 23 which receives carry output from the binary adder 10.

The binary adder effects pure binary addition in response to the inputs applied in serial fashion to each of input terminals 20,21 and 22. This sum appears at its output terminal 25. The terminal 25 is connected to the input terminal 23 of delay circuit 14 in series with delay circuit 15. The output terminal 22 of delay circuit 15 is connected by a lead 27 to the input terminal 20 of binary adder 12.

Each delay circuit receives an input pulse representing a binary bit during the occurrence of one binary column and produces an output during the occurrence of the next binary column. Hence, if binary 1 representing a decimal 8 is present at the input terminal 23 of delay circuit 14 the binary 1 representing decimal 4 is present at the output terminal 22 of delay circuit 14 and input terminal 23 of delay circuit 15. The time delay effected is equal to the time occurrence between successive binary columns. This particular time is a matter of design and that actually employed herein was approximately one microsecond.

Since the binary adder 10 in conjunction with delay circuit 13 effects addition of the two binary decimal numbers applied to input terminals 20 and 21 in pure binary fashion the output produced at its terminal 25 may not be in the binary-decimal system. The binary-decimal discriminator 11 is provided to insure that the sum appearing at output terminal 28 of binary adder 12 is in the binary-decimal system. Hence, the binary-decimal discriminator inspects the output of binary adder 10 and supplies pulses to the binary added 12 to effect the addition of 6 (0110) therein when the sum of any two groups of four binary bits (one decimal column) is greater than 9, that it to say when either of the above-mentioned two criteria exists.

This inspection and correction is performed once upon the sum of each two groups of four binary bits added or once for each decimal column of the sum. This time is determined by the application of a column pulse to the terminal 29 of binary-decimal discriminator 11. This column pulse occurs during the same binary column or order of each decimal column and may be derived from any suitable source. The means for providing such a timed column pulse does not constitute part of this invention.

To inspect for the existence of the first criteria, i.e. existence of carry, a lead 30 is connected between the terminal 23 connected to the binary adder 10 and terminal 31 of the binary-decimal discriminator.

To inspect for the existence of the second criteria, i.e. existence of a binary 1 in the fourth binary column plus a binary 1 in the second or third binary column (decimal sum greater than 9), it is necessary to inspect only the second, third and fourth binary columns since the existence of a binary 1 in the first binary column is immaterial. Such inspection is effected simultaneously with that for the first criteria and with the occurrence of a column pulse. The output resulting from addition of the first binary columns is allowed to pass from the output terminal 28 and inspection is effected when the sum of the second binary columns appears at the output terminal 28, such as denoted by a circled 2 thereat. Similarly, a circled decimal number indicates the position throughout the circuit of the binary column which it represents when inspection is effected, i.e. circled 4, 8, and 16 for the third binary column, fourth binary column and carry respectively. From this representation it is seen that negligible delay is caused by the binary adders 10 and 12 and by the binary-decimal discriminator.

For inspection of the fourth binary column a lead 32 is connected between the terminal 23 of delay circuit 14 and a terminal 33 of binary-decimal discriminator 11. For inspection of the third binary column a lead 34 is connected between the terminals 22—23 (between delay circuits 14 and 15) and a terminal 35 of binary-decimal discriminator 11. Similarly, for inspection of the second binary column a lead 36 is connected between the terminal 22 of delay circuit 15 and terminal 37 of the binary-decimal discriminator 11.

A lead 38 is connected between the input terminal 22 of binary adder 12 and terminal 39 of binary-decimal discriminator 11 to indicate whether or not carry results from binary addition of the first binary column in binary adder 12. Such addition may be effected as a result of the addition of 6 (0110) to the previous group of four binary bits. In other words, this lead 38 and the lead 36 are required to determine whether or not a binary 1 is present in the second binary column (decimal 2) of the sum.

If either of the criteria is present the binary-decimal discriminator is operative to produce a pulse at its output terminal 42. This pulse is transferred over a lead 43 to the input terminal 21 of the binary adder 12 to effect the addition of 2 (0010) therein. The same pulse appearing at output terminal 42 is also present at the terminal 44 connected to the terminal 23 of delay circuit 16. The delay circuit 16 produces an output pulse at its terminal 22 during the next time interval when the third binary column or bit representing decimal digit 4 is present at the inputs of binary adder 12. This pulse is applied to the terminal 46 of binary-decimal discriminator 11 and causes a pulse to be produced at the output terminal 42 thereof. This pulse is applied over the lead 43 to the terminal 21 of binary adder 12 to effect the addition of 4 (0100) therein. A total of 6 (0110) has now been added to the sum applied to the binary adder 12 from the binary adder 10 and the sum of the two numbers applied to the input terminals 20 and 21 of binary adder 10 appears in the binary-decimal system at the output terminal 28 of binary adder 12.

Various circuits used herein or particular points within the circuits are frequently referred to as being Up or Down. Up means that the voltage present at the particular point or at the output of the circuit designated is positive with respect to ground. Down means that the voltage present at the particular point or at the output of the circuit designated is negative with respect to ground. If the control grid of a vacuum tube is referred to as Down, it means that the voltage at that control grid is below the cutoff value for the vacuum tube.

Numerous coincidence circuits are employed herein. An And circuit refers to a circuit which is operable to produce a positive voltage at its output terminal only when all of the input terminals thereof have a positive voltage applied thereto simultaneously. An Or circuit refers to a circuit operable to produce a positive voltage at its output terminal when any one or more of the input terminals thereof has a positive voltage applied thereto.

Figure 2A:
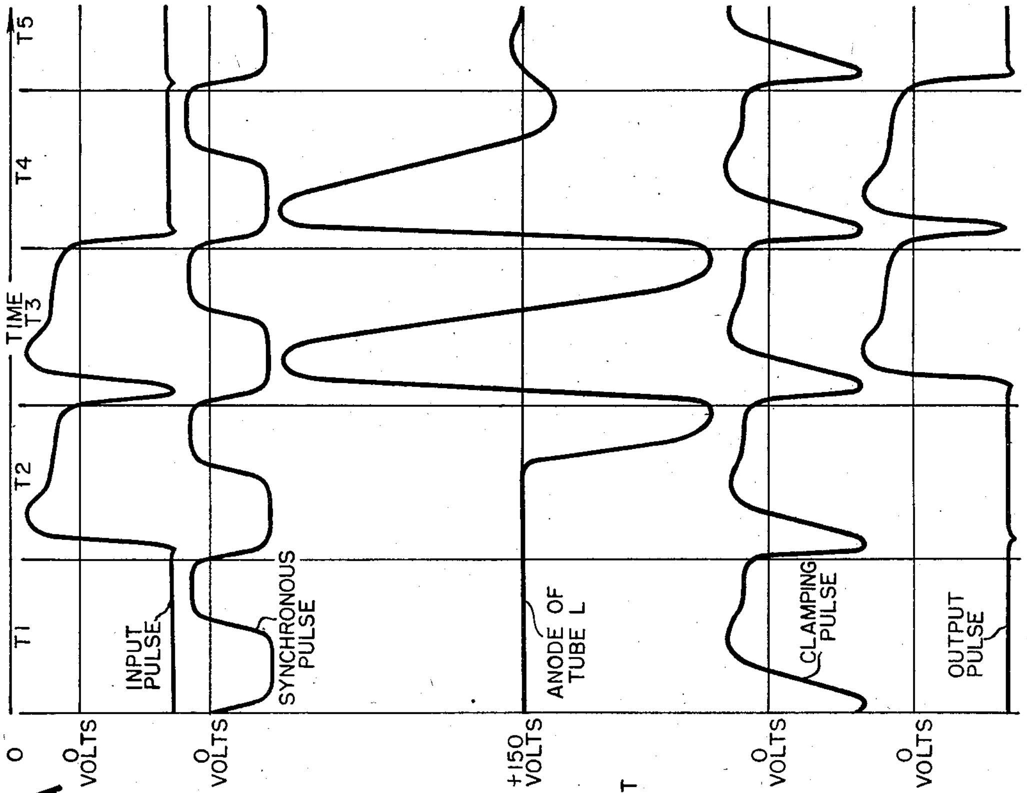
Fig. 2*a* is a diagram showing the wave forms present in various parts of the circuit of Fig. 2.
Figure 2:
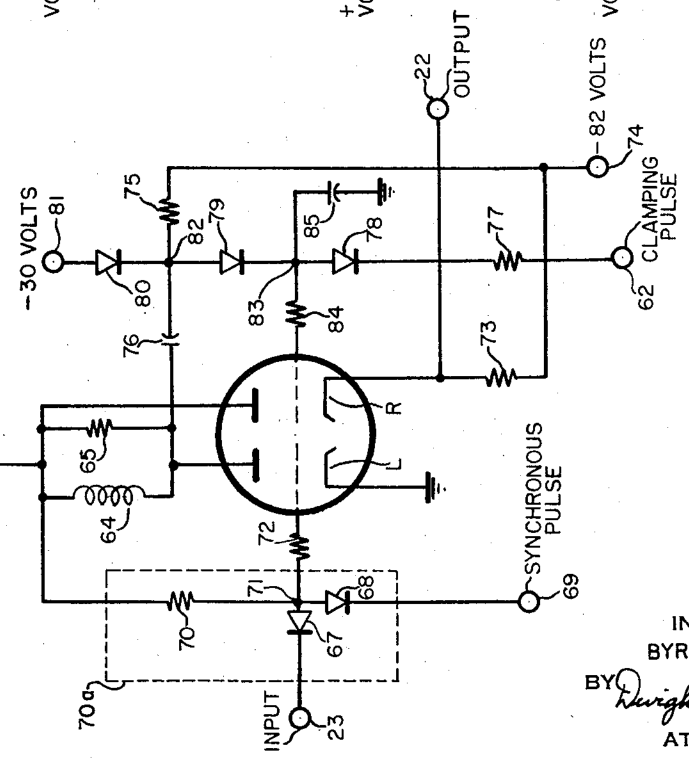
Fig. 2 is a circuit diagram of the delay circuit used in the embodiment of Fig. 1.

Referring more particularly to Figs. 2 and 2*a*, the delay circuit actually used in Fig. 1 will be described. This circuit is claimed in the reissued patent of Byron L. Havens, No. Re. 23,699, granted August 18, 1953. The curves of Fig. 2*a* demonstrate the operation of the circuit shown in Fig. 2. In order to facilitate the description, the time axis (abscissa) is divided into equal time intervals designated T1, T2, T3, T4 and T5, respectively. The length of each of these time intervals is dependent upon the particular circuit design. As one example, each time interval may be approximately one microsecond duration.

Briefly, an input pulse (Fig. 2*a*) is applied to the input terminal 23 of the circuit shown in Fig. 2 during one preselected time interval and produces an output pulse (Fig. 2*a*) at the output terminal 22 during the next subsequent time interval. An input pulse may be applied to the input terminal 23 during the same time interval, T3 for example, that an output pulse is produced at the output terminal 22. The flyback produced by an input pulse is used to set up the output pulse and the circuitry is such that there is complete isolation between the output and input pulse during any given time interval.

A clamping pulse (Fig. 2*a*) is applied to the terminal 62 to wipe out or remove the information stored after that information has been utilized.

A dual type tube having two triode tube sections is employed. For convenience, the left-hand tube section is referred to as the tube L and the right-hand tube section is referred to as the tube R. The anode of tube L is connected through inductance 64 and an anode load resistor 65 in parallel to a +150 volt terminal 66. The inductance 64 is provided to increase the voltage swing in the positive direction at the anode of the tube L (Fig. 2*a* during T3 and T4) for a preselected time immediately after that tube is rendered non-conductive.

The diode rectifiers 67 and 68 connected respectively to input terminal 23 and terminal 69, and the resistor 70 connected between the juncture 71 of the diodes 67 and 68 and the +150 volt terminal 66 comprise an And circuit generally designated as 70*a*. This juncture 71 is connected through a parasitic suppressor resistor 72 to the control grid of the tube L.

The tube R is operated as a cathode follower and is always conductive during operation of the delay circuit.

The cathode load resistor 73 is connected to a −82 volt terminal 74 which is also connected through a resistor 75 and a condenser 76 to the anode of the tube L. The terminal 62 is connected through a resistor 77 and diode rectifiers 78, 79, and 80, in series, to a −30 volt terminal 81. The juncture 82 is connected between the rectifiers 79 and 80 and between the resistor 75 and condenser 76. The juncture 83, joining rectifiers 78 and 79, is connected through a parasitic suppressor resistor 84 to the control grid of the tube R and through a condenser 85 to ground.

During the time interval T1, an input pulse is not applied to the input terminal 23 and juncture 71 is therefore Down so that a positive voltage is not applied to the control grid of the tube L. During this time interval the tube L is non-conductive, tube R is conductive, and output terminal 22 is Down. The voltage at the anode of tube L is +150 volts and the condenser 76 is charged with 180 volts appearing across it, the left plate is at +150 volts and the right plate is at −30 volts. The juncture 82 cannot be appreciably more negative than the −30 volt terminal 81 because when such is attempted the rectifier 80 conducts and maintains the voltage at juncture 82 to essentially that of the terminal 81. It is the conduction of rectifier 80 during the time interval T1 that keeps juncture 82 at approximately −30 volts. The resistor 75 tends to prevent the voltage at juncture 82 from drifting between the application of successive clamping pulses.

The juncture 83 is also at −30 volts and condenser 85 is charged with −30 volts on its upper plate and its lower plate is at zero volts (ground). Rectifier 79 conducts when condenser 85 is being charged or when the clamping pulse (Fig. 2*a*) applied to the terminal 62 attempts to pull the juncture 83 below −30 volts, the voltage at the terminal 81. Hence, when the clamping pulse is most negative, the voltage at the control grid of the tube R has been pulled Down, and since tube R is a cathode follower, the voltage at the output terminal 22 is also pulled down.

This action effects the wiping out of the information stored after that information has been used. In other words, the output pulse produced is brought to an end as shown at the beginning of time intervals T4 and T5 (Fig. 2*a*). When the clamping pulse thus goes negative the rectifier 78 is rendered conductive.

During the latter portion of time interval T2 the input pulse and synchronous pulse are both positive simultaneously. The juncture 71 is therefore Up and the tube L becomes heavily conductive and the voltage at its anode decreases rapidly (Fig. 2*a*). The condenser 76 discharges through the tube L. The resulting tendency of juncture 82 to acquire the same voltage increment as the anode of the tube L is arrested by the conduction of rectifier 80 and the voltage at this juncture remains −30 volts.

Just at the start of time interval T3 both the input pulse and synchronous pulse go negative and the voltage at the juncture 71 and control grid of tube L accordingly goes Down and tube L is rendered non-conductive. As a result, the voltage at the anode of the tube L increases rapidly and actually exceeds +150 volts because this anode circuit is less than critically damped during the flyback time. It is this increased voltage or flyback, which initiates the output pulse. This voltage is transferred through condenser 76 to cause the voltage at juncture 82 to go Up (to approximately +5 volts) from −30 volts. The rectifier 79 then conducts to cause the juncture 83 and control grid of tube R to go Up and the upper plate of condenser 85 is charged positive relative to its lower or grounded plate. The voltage at the output terminal 22 connected to the cathode of the tube R follows the control grid thereof and goes Up to initiate the output pulse during the time interval T3.

As the voltage at the anode of the tube L decreases toward +150 volts the voltage at juncture 82 similarly decreases. During the latter portion of time interval T3 the voltage at the juncture 82 is again approximately −30 volts. Both the terminals 23 and 69 again go positive as shown by the second input pulse and synchronous pulse which occur during the latter part of time interval T3 while the output terminal 22 is still Up.

As a result the tube L again becomes heavily conductive and the voltage at its anode decreases and the juncture 82 again remains at −30 volts because of the conduction through rectifier 80.

When the clamping pulse goes negative at the start of time interval T4, conduction through rectifiers 78, 79, and 80 results and juncture 83 as well as juncture 82 is placed at approximately −30 volts. The control grid of tube R and output terminal 22 therefore go Down and the output pulse, occurring during time interval T3 and produced in response to the input pulse applied during time interval T2, is terminated.

When the juncture 71 goes Down at the start of time interval T4, the tube L becomes non-conductive and its anode voltage starts to increase rapidly as described hereinbefore.

This increased voltage causes the juncture 82 to go Up, the juncture 83 to go Up and the output terminal 22 to go Up as indicated by the output pulse occurring during time interval T4. The voltage at the anode of the tube L finally settles, during the time interval T5, at a steady value of +150 volts in accordance with the damping effect. If an input pulse was applied during the time interval T4, the voltage at the anode of tube L would never reach a steady value of +150 volts. Such is indicated by this anode voltage during the time interval T3.

Just prior to the anode of tube L reaching a steady voltage value the clamping pulse goes negative (time interval T5). At this time the juncture 82 has again assumed a voltage value of −30 volts but the juncture 83 is still Up. When the clamping pulse causes the terminal 62 to go negative the rectifiers 78, 79 and 80 are rendered conductive and the voltage at the juncture 83 goes Down to terminate the output pulse at the beginning of time interval T5.

It is now clear that the use of flyback makes possible the production of an output pulse in one preselected time interval in response to an input pulse received during the next prior time interval and that rectifier circuitry and a clamping pulse are employed to effect complete isolation between input and output circuits simultaneously operable.

It is understood that any suitable delay circuit may be employed by the invention and that the various voltage values were given merely to facilitate the description and understanding of the circuit operation. Also, the particular values of the circuit components used will vary in accordance with the particular operation the delay circuit is required to perform.

Figure 3:
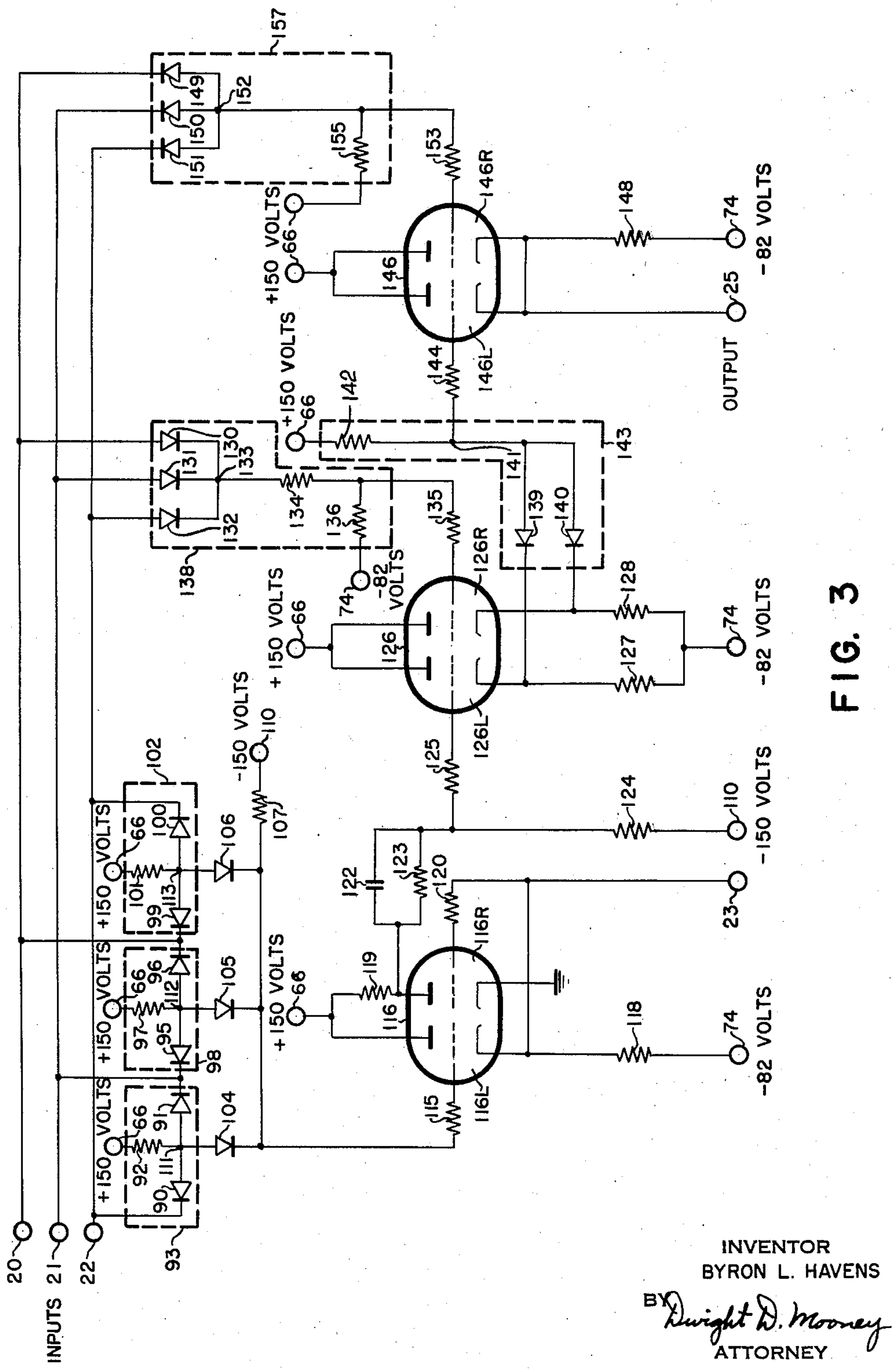
Fig. 3 is a circuit diagram of the binary adder employed in the embodiment of Fig. 1.

Referring more particularly to Fig. 3 the novel circuit shown effects addition in true binary fashion. As stated the presence of a pulse on one of the input terminals 20, 21 and 22 indicates the presence of binary 1 and the absence of a pulse thereat indicates a binary 0. Hence, to effect addition in true binary fashion the output terminal 25 must exhibit a binary 0 when no input pulse is applied to the input terminals 20–22 inclusive, a binary 1 when an input pulse is applied to one input terminal, a binary 0 and a binary 1 carry when pulses are applied to two input terminals, and a binary 1 and a binary 1 carry when pulses are applied to all three input terminals. These functions are performed by the circuitry shown.

The diode rectifiers 90 and 91 are connected together and their other terminal is connected to input terminals 22 and 21 respectively. These diodes and resistor 92 comprise an And circuit 93. The diodes 95 and 96 and the resistor 97 are similarly connected together and to the input terminals 21 and 20 to form an And circuit 98. Likewise, the diodes 99 and 100 and resistor 101 are connected together and to the input terminals 22 and 20 to form an And circuit 102. Each of the diodes 104, 105 and 106 in conjunction with resistor 107 connected to a −150 volt terminal 110 comprise an Or circuit.

If no positive input is supplied to the input terminals 20, 21 or 22, the junctures 111, 112 and 113 are at a negative voltage. The voltage at these junctures will be rendered positive only if an input pulse (binary 1) is present at both input terminals of the And circuit of which that juncture is a part, for example, if a binary 1 is present at input terminals 21 and 22 the And circuit 93 is operative or Up to produce a positive pulse at the juncture 111 thereof.

This positive pulse at juncture 111 renders the diode 104 conductive to transfer a positive pulse through the parasitic suppressor resistor 115 connected to the control grid of the tube 116 having left-hand and right-hand triode tube sections referred to herein as tubes 116L and 116R respectively. Similarly, the And circuit 98 is rendered operative to cause diode 105 to conduct to provide a positive pulse at the control grid of the tube 116L when a positive pulse is present at the input terminals 20 and 21. Likewise, And circuit 102 causes the conduction of diode 106 to apply similar positive pulse when input terminals 20 and 22 are positive.

It follows that a positive pulse is present at the control grid of the tube 116L when a positive pulse (binary 1) is present on any two or on all three input terminals 20, 21 and 22. The cathode of the tube 116L is connected through a load resistor 118 to the −82 volt terminal 74 and its anode is connected directly to the +150 volt terminal 66. The anode of the tube 116R is connected through a load resistor 119 to the +150 volt terminal 66. The control grid of the tube 116R is connected through parasitic suppressor resistor 120 to the terminal 23 which is also connected to the cathode of the cathode follower tube 116L.

The cathode of tube 116L and the terminal 23 connected thereto are therefore Up when two or three inputs are applied to the binary adder. The resulting positive voltage appearing at terminal 23 therefore properly indicates carry. The control grid of the tube 116R is also Up when this carry is produced.

The condenser 122 and resistor 123, in parallel, are connected to the anode of the tube 116R, to the −150 volt terminal 110 through resistor 124 and through parasitic suppressor resistor 125 to the control grid of the tube 126 having left-hand and right-hand triode tube sections designated as tubes 126L and 126R respectively. When the tube 116R is thus rendered conductive in response to the presence of a carry, a negative pulse is transferred from its anode through the condenser 122 and resistor 123, in parallel, and the resistor 125 to the control grid of the tube 126L to cause the voltage at that grid to go Down. The anode of each of the tubes 126L and 126R is connected to the +150 volt terminal 66. The cathodes of each of the tubes 126L and 126R are connected through resistors 127 and 128 respectively to the −82 volt terminal 74. The tubes 126L and 126R are operated as cathode followers. The voltage at the cathode of the tube 126L is therefore Down when the voltage at its control grid is Down and Up when the voltage at its control grid is Up.

It is seen, therefore, that the voltage at the cathode of the tube 126L is Down when either two or three positive inputs are applied to the binary adder and that the voltage at that cathode is Up when no input or one input is applied to the adder. The diodes 130, 131 and 132 each have one of their plates connected to the input terminals 20, 21 and 22 respectively and their other plate connected to the juncture 133. This juncture is connected through a voltage dropping resistor 134 and parasitic suppressor resistor 135 to the control grid of the tube 126R. The voltage dropping resistor 134 is also connected through the load or pull down resistor 136 to the —82 volt terminal 74. The diodes 130, 131 and 132, the voltage dropping resistor 134, and pull down resistor 136 comprise an Or circuit 138. The juncture 133 is normally Down and when one, two or three inputs are applied the juncture 133 is Up. This causes the control grid of the tube 126R to be Up when one, two or three inputs are applied to the adder and to be Down when no input is applied thereto. The cathode of the tube 126R is therefore in the Up condition when one, two or three inputs are applied to the adder. The diodes 139 and 140 have one of their plates connected to the cathode of the tubes 126L and 126R respectively and their other plate commonly connected to a juncture 141 which is connected through a load or pull up resistor 142 connected to the +150 volt terminal 66. The diodes 139 and 140 and the pull up resistor 142 comprise an And circuit 143.

Since the cathodes of the tubes 126L and 126R are both Up only when one input is applied to the adder it follows that the juncture 141 is Up only when one input is applied.

The juncture 141 is connected through a parasitic suppressor resistor 144 to the control grid of the tube 146 having left-hand and right-hand triode tube sections designated 146L and 146R respectively. The anodes of the tubes 146L and 146R are commonly connected to the +150 volt terminal 66 and their cathodes are commonly connected through load resistor 148 to the —82 volt terminal 74 and to the output terminal 25. The diodes 149, 150 and 151 each have one of their plates connected to the input terminals 20, 21 and 22 respectively and their other plate commonly connected to a juncture 152 which is connected through a parasitic suppressor resistor 153 to the control grid of the tube 146R and through a load or pull up resistor 155 to the +150 volt terminal 66. The diodes 149, 150 and 151 and the pull up resistor 155 comprise an And circuit 157.

The juncture 152 is normally Down and will be Up only when three inputs are applied to the adder. Likewise, the control grid of the tube 146R will be Up only when three inputs are applied to the adder.

When the control grid of the tube 146L is Up in response to one input being applied to the adder its cathode will also be Up and an output will be produced at the output terminal 25 as indicated by that terminal being Up. Also, when the control grid of the tube 146R is Up as a result of three inputs being applied to the adder its cathode will be Up and the output terminal 25 will be Up.

Hence, an output is produced at the terminal 25 when a binary 1 is present at one or three inputs of the binary adder. Previously, it has been shown herein that the terminal 23 is Up or a carry is provided when a binary 1 is present at two or three inputs of the adder. Obviously, therefore, the circuit of Fig. 3 effects addition in the true binary notation.

This identical circuit is employed in the binary adders 10 and 12 of Fig. 1. The output terminal 25 is designated as 25 for the adder 10 in Fig. 1 and as 28 for the adder 12 in Fig. 1 to avoid any confusion in the understanding of the operation of Fig. 1 since the terminal 28 thereof provides the output for the entire binary-decimal adder.

Figure 4:
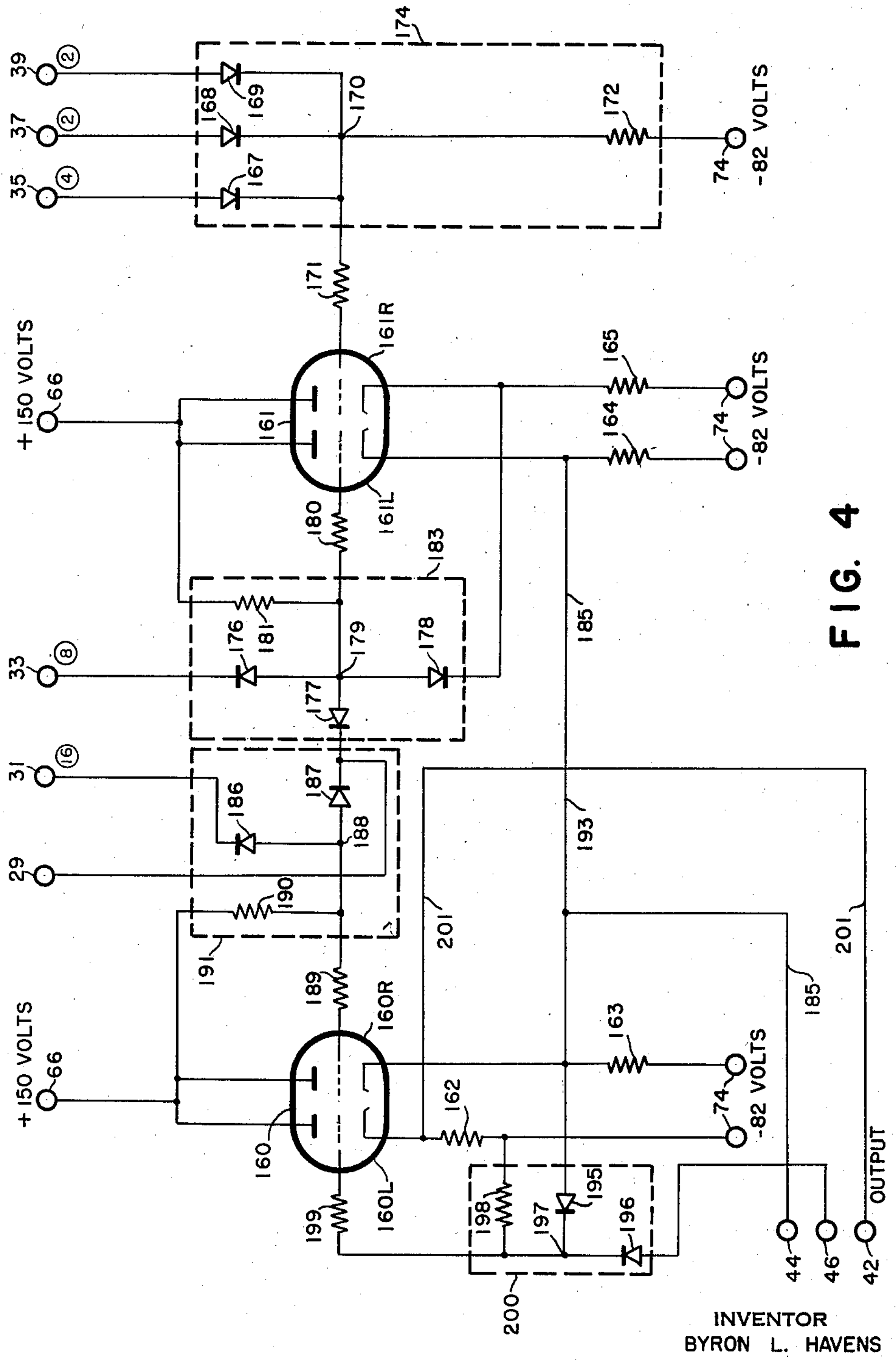
Fig. 4 is a circuit diagram of the binary-decimal discriminator employed in the embodiment of Fig. 1.

Referring more particularly to Fig. 4, the circuit diagram of the binary-decimal discriminator 11 (Fig. 1) includes two tubes 160 and 161, each having two triode tube sections referred to as tubes and designated respectively as 160L, 160R, 161L and 161R. The cathodes of the tubes 160L, 160R, 161L and 161R are connected to the —82 volt terminal 74 through load resistors 162, 163, 164 and 165, respectively. Each of these tubes has its anode connected directly to the +150 volt terminal 66 and is operated as a cathode follower.

The diodes 167, 168 and 169 have their plates connected to the terminals 35, 37 and 39, respectively. The cathodes of diodes 167, 168 and 169 are commonly connected to juncture 170 which is connected through a parasitic suppressor resistor 171 to the control grid of the tube 161R and through a load or pull down resistor 172 to the —82 volt terminal 74. The diodes 167, 168 and 169 and the resistor 172 comprise an Or circuit 174. The juncture 170 of Or circuit 174 is normally Down.

Inspection is effected by application of a column pulse. If a binary 1 is present in the third binary column, at inspection time (decimal 4), the terminal 35 is Up and the diode 167 is rendered conductive. Similarly, if a binary 1 is present in the second decimal column (column 2) the terminal 37 and the diode 168 is rendered conductive. If a binary 1 is present in the secondary binary column (decimal 2) as a result of carry effected in the binary adder 12 (Fig. 1) the terminal 39 is Up and the diode 169 is rendered conductive. Hence, if any one of the terminals 35, 37 and 39 is Up (i.e. decimal 4 or decimal 2 present) the juncture 170 and the control grid of the tube 161R are Up. The voltage at the cathode of the tube 161R is, therefore, Up.

Diodes 176, 177 and 178 have their cathodes connected to terminals 33, 29, and the cathode of tube 161R respectively. The plates of diodes 176, 177 and 178 are connected to a juncture 179 which is connected through a parasitic suppressor resistor 180 to the control grid of 161L and through a pull up or load resistor 181 to the +150 volt terminal 66. The diodes 176, 177 and 178 and the pull up resistor 181 comprise an And circuit 183. The juncture 179 and the control grid of tube 161L are normally Down.

When a column pulse is applied to the terminal 29, a binary 1 exists in the fourth binary column (decimal 8), and the cathode of tube 161R is Up, the juncture 179 is Up. Accordingly, the cathode of the tube 161L is Up and the terminal 44 connected thereto by lead 185 is Up. Hence, an output is produced at the terminal 44 when a binary 1 exists in the fourth binary column and a binary 1 exists in the third or second binary columns. In other words, the decimal equivalent of the binary notation is greater than 9 and the second criterion exists.

The diodes 186 and 187 have their cathodes connected to the terminal 31 and the cathode of diode 177, respectively. Their plates are connected to a juncture 188 which is connected through a parasitic suppressor resistor 189 to the control grid of the tube 160R and through a pull up or load resistor 190 to the +150 volt terminal 66. The diodes 186 and 187 and pull resistor 190 comprise an And circuit 191. When a carry is present (decimal 16) the terminal 31 is Up. If a column pulse is present at terminal 29 that terminal is Up and the juncture 188 and the control grid of tube 160R are Up. Accordingly, the cathode of tube 160R is Up when a carry is produced. As a result of the increased voltage at the grid of tube 160R an increased voltage is transferred from the cathode 160R over leads 193 and 185 to the terminal 44. It should be noted that the cathodes of 160R and 161L each connected to terminal 44 in combination with resistors 163 and 164 comprise a cathode follower Or circuit.

The diodes 195 and 196 have their plates connected to the cathode of tube 160R and to the terminal 46 respectively. The cathodes of diodes 195 and 196 are connected to juncture 197 which is connected through a pull down or load resistor 198 to the —82 volt terminal 74 and through parasitic suppressor resistor 199 to the control grid of the tube 160L.

The diodes 195 and 196 and pull down resistor 198 comprise an Or circuit 200. The juncture 197 of Or circuit 200 is normally Down and the cathode and grid of 160L are, therefore, normally Down. When the terminal 44 is Up, the diode 195 is rendered conductive and juncture 197 and the control grid of the tube 160L go Up. Accordingly, the cathode of the tube 160L goes Up. This increased voltage is transferred over a lead 201 to the output terminal 42. The voltage at the input terminal 21 of binary adder 12 (Fig. 1) therefore goes Up to add a binary 1 in the second binary column (decimal 2). At the same time, the voltage at the terminal 44 connected to the input terminal 23 of delay circuit 16 (Fig. 1) goes Up. During the next time interval or when the next binary column occurs the terminal 46 goes Up as described in connected with Figs. 2 and 2*a*. The diode 196 is rendered conductive as a result juncture 197, control grid of 160L, cathode of 160L and output terminal 42 go Up. An increased voltage is, therefore, again transferred to the terminal 21 of the binary adder 12 (Fig. 1). This pulse or binary 1 occurs during the third binary column and therefore effects the addition of a decimal 4 in the binary adder. Hence, if either of the criteria is present a decimal 6 expressed in the binary notation is added into the binary adder 12 by adding a binary 1 into the second and third columns of the sum in the binary adder 12 (Fig. 1).

From the above detailed description of the circuit operation, it is clear that the adder effects addition as indicated in Table I.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a serial binary-decimal discriminator for sensing a sum expressed in the binary notation and supplying a correction factor to be added thereto to express the sum in the binary-decimal system; an Or circuit; means connected to apply electrical manifestations representing the sum of a plurality of binary orders to a plurality of input terminals of said Or circuit; an output terminal; And circuit means connected to supply a first output at said output terminal when an electrical manifestation representing the sum of a higher binary order and the output of said Or circuit are simultaneously applied thereto; delay circuit means connected to said And circuit means, and responsive to an output from said And circuit means for producing a second output, displaced in time from said first output, at said output terminal, whereby said first and second outputs respectively, appearing at said output terminal constitute said correction factor.

2. In the serial binary-decimal discriminator set forth in claim 1, second And circuit means connected to be responsive to the presence of a carry manifestation from said higher binary order, occurring simultaneously with the sum sensed to apply an output to said output terminal and an input to said delay circuit means.

3. A binary-decimal adder of the serial type for adding two numbers represented in the binary-decimal notation wherein the presence in each binary column of a pulse indicates a binary 1 and the absence of a pulse indicates binary 0, including first and second binary adders having three input lines, two for receiving said numbers to be added and one for receiving a carry pulse; first input sensing means connected to said input lines for producing an output when inputs are present on at least two of said input lines to provide a carry pulse at a first output terminal, a first delay circuit connected between said first output terminal and said input line for receiving a carry pulse and supplying an input pulse to the input line during occurrence of the next binary column, pulse transfer means connected to be responsive to an input at any of said input lines to produce an output, first electronic means connected to be responsive only to the outputs of said first input sensing means and said pulse transfer means to provide an output only when an input is present at one input line, a first And circuit connected to said input lines to provide an output only when inputs are present at all three of said input lines, and second electronic means connected to the output of said first And circuit and the output of said first electronic means to provide an output to a second output terminal when an input is present at one or three input lines; means including second and third delay circuits connecting the second output terminal of said first binary adder to one input line of said second binary adder to transfer the output of said first binary adder to the input of said second binary adder; a binary-decimal discriminator for sensing the presence of carry at said first and second binary adders and the output of said first binary adder once during the occurrence of each four successive binary columns including, an Or circuit having an output terminal and a first input terminal connected to the input line of said second binary adder for receiving a carry pulse and a second input terminal connected to said one input line of said second binary adder and a third input terminal connected between said second and third delay circuits to provide an output at its output terminal when a binary 1 is present at either of its input terminals, a second And circuit having one input terminal connected to the output terminal of said Or circuit and another input terminal connected to the output terminal of said first binary adder, a connection from the output terminal of said second And circuit to the other input line of said second bniary adder, a fourth delay circuit for producing an output in response to an input applied at the occurrence of the previous binary column, and a connection for applying the output of said second And circuit to said delay circuit, a third And circuit having one input terminal connected to said second output terminal of said first binary adder and its output terminal connected to said other input line of said first binary adder and to the input of said fourth delay circuit whereby the output at the second output terminal of said second binary adder is in the binary-decimal system.

4. An electronic adding device for adding together two numbers each represented by a serial train of pulses in coded group form, the successive pulse positions in each group representing the value of successive terms of the binary series, comprising first adding means for adding together the two pulse trains representing the two numbers to form a first sum pulse train, means for generating filler pulses representing a "filler" digit equal to the difference between the radix of notation of the two said numbers and the sum of all the binary values which may be represented in a single pulse group increased by one, second adding means for adding together said first sum pulse train and said filler pulses, control means operated for said first sum pulse train by a carry from that train during the additions in said first adding means, and means controlled by said control means for effecting addition by said second adding means of said filler pulses to said first sum pulse train to produce a final sum pulse train.

5. An electronic adding device for adding together two numbers each represented by a serial train of pulses in coded group form, the successive pulse positions in each group representing the value of successive terms of the binary series, comprising first adding means for adding together the two pulse trains representing the two numbers to form a first sum pulse train, means for generating filler pulses representing a "filler" digit equal to the difference between the radix of notation of the two said numbers and the sum of all the binary values which may be represented in a single pulse group increased by one, second adding means for adding together said first sum pulse train and said filler pulses, means for sensing said first sum pulse train and producing a signal when the sum of the binary values represented in a single pulse group is equal to or greater than the radix of notation of the two said numbers including a delay means for delaying transmission of said first sum pulse train to said second adding means for a time less than the time of transmission for the successive pulse positions in a single pulse group, and control means operated for said first sum pulse train by a carry from that train during the additions in said first adding means or by said signal from said sensing means to effectuate said filler pulse generating means for effecting addition by said second adding means of said filler pulses to said first sum pulse train to produce a final sum pulse train.

6. An electronic adding device for adding together two decimal numbers each represented by a serial train of pulses in coded group form, the successive pulse positions in each group representing the value of successive terms of the binary series, said electronic device consisting of: a first binary full adder means for adding together the two pulse trains representing the two numbers to form a first sum pulse train, first means for generating filler pulses representing a "filler" digit equal to the difference between the radix of notation of the two said numbers and the sum of all the binary values which may be represented in a single pulse group increased by one; and additional means cooperating with said binary full adder means and said first means for rendering a binary-coded decimal output sum pulse train representative of the arithmetic sum of said two decimal numbers.

7. A serial type binary-coded decimal adder for adding a first decimal number represented in binary-coded decimal notation by a first serial pulse train to a second decimal number represented in binary-coded decimal notation by a second serial pulse train and providing a sum pulse train representative of the sum of said decimal numbers expressed in binary-coded decimal notation, said serial type binary coded-decimal adder consisting of: a first full binary adder for adding serial inputs and rendering sum and carry outputs; a second binary full adder for adding serial inputs and rendering sum and carry outputs; first circuit means interconnecting said first and second binary full adders, and including a binary-decimal discriminator operable to sense, at a preselected time during binary addition, the sum output of said first binary full adder and the presence of a carry output by said first and second binary adders, respectively; electronic circuit means connected to be energized to produce a first pulse when a carry is present, or when the binary sum output of said first binary adder is greater than decimal nine in value; a connection for applying said first pulse to an input of said second binary adder and; delay means connected to be energized by said first pulse to produce a second pulse, time displaced from said first pulse, and in time coincidence with the next binary columns to be added in said second binary adder.

References Cited in the file of this patent

UNITED STATES PATENTS

| | | |
|---|---|---|
| 2,694,521 | Newman et al. | Nov. 16, 1954 |
| 2,749,034 | Williams et al. | June 5, 1956 |
| 2,758,787 | Felker | Aug. 14, 1956 |

FOREIGN PATENTS

| | | |
|---|---|---|
| 678,427 | Great Britain | Sept. 3, 1952 |

OTHER REFERENCES

"Theory and Techniques for Design of Electronic Digital Computers," University of Pa., volume 3, June 30, 1948; pages 23–1 to 23–4.

ERA-High-Speed Computing Devices, Engineering Research Associates, McGraw-Hill Book Co., Inc., New York, copyright 1950, pages 289–293.

Synthesis of Electronic Computing And Control Circuits, Computation Lab., Harvard Univ. Press, Cambridge, Mass. Copyright 1951, pages 184 to 186.

"On Optimum Relations Between Circuit Elements and Logical Symbols in the Design of Electronic Calculators" by Andrew D. Booth, Journal of the British Institution of Radio Engineers, December 1952; pages 587–594.

"Typical Block Diagrams for a Transistor Digital Computer," by J. H. Felker, Electrical Engineering; December 1952, pages 1103 to 1108.